Jan. 19, 1965   E. P. RESOS   3,166,212
SEGMENTED TANKS
Filed Sept. 4, 1962   2 Sheets-Sheet 1

INVENTOR.
EUGENE P. RESOS
BY
ATTORNEY

Jan. 19, 1965   E. P. RESOS   3,166,212
SEGMENTED TANKS

Filed Sept. 4, 1962   2 Sheets-Sheet 2

INVENTOR.
EUGENE P. RESOS

BY
ATTORNEY

United States Patent Office 3,166,212
Patented Jan. 19, 1965

3,166,212
SEGMENTED TANKS
Eugene P. Resos, Hacienda Heights, Calif., assignor to North American Aviation, Inc.
Filed Sept. 4, 1962, Ser. No. 221,112
4 Claims. (Cl. 220—23.4)

This invention relates generally to tank structures and more particularly to segmented container structure for storage of fluids.

In the construction of tank structures the problems of structural integrity, freedom from leakage and high reliability are often of a primary concern. This concern is particularly emphasized at remote locations where quality control equipment is not readily available. To minimize the problems which arise from fabrication techniques certain procedures have been accepted as having sufficiently high reliability for critical structures. Thus, for example, assembly by means of bolts or rivets is accepted for field operations. Welding in the field has not achieved sufficient reliability for many applications. For high reliability welds radiographic or other elaborate inspection techniques are required. The welding of large tank structures in a factory environment is ordinarily done with automatic welding equipment which can accurately control the necessary parameters for high efficiency welds. It is also possible in the factory to have sensitive inspection equipment unavailable in field operations. The presently available welding techniques are not suitable for high reliability large tank structures assembled in the field.

The customary method of fabrication involves the assembly by means of mechanical fasteners of a multiplicity of individual sheets. In a field fastening process it is therefore necessary to use gaskets or some similar type of packing material to secure the container against leakage. In many of the applications in which large tank structures are required gaskets do not provide sufficient reliability to be acceptable in the presence of thermal and mechanical stresses. When one is handling cryogenic or corrosive fluids the conventional methods and materials for gasketing and sealing containers are usually not suitable and it is often necessary to use integral containers. This may also be necessary due to the extreme expense of the fluids being handled or because of the safety of personnel and apparatus which may be exposed to the fluids. Thus, if one requires a large highly reliable container, it is necessary to fabricate this container in some suitable manufacturing facility and transport the container to the location in which it is to be used. As the necessary containers become extremely large existing transportation facilities may be incapable of conducting the move.

An alternative to the construction of a single large container is the accumulation of a large number of smaller transportable size independent containers that have been previously manufactured under the requisite quality control conditions. If in addition to requiring a large storage capacity one needs a single structural unit, it will be necessary to form a cluster of the smaller containers with suitable interconnection means. However, the clustering of a large number of cylindrical tanks of similar size is cumbersome, complicated and heavy. The volumetric efficiency of such a structure is relatively low, that is, an appreciable volume of the completed structure is not occupied by the fluids being contained. The structural efficiency of such a cluster is also poor, yielding a high strength to weight ratio.

As an example of the area in which the above considerations have become acute, reference is made to modern high-thrust rocket boosters. Newer and more modern space vehicles will be much larger, heavier and more sophisticated than those that have been launched to date. These vehicles will require enormous boosters to launch them to orbital or escape velocities. Very large quantities of fuel are required to be stored in the tanks of the booster for launch operations. Two of the biggest problems inherent in the large tanks are manufacturing facilities and logistics. The fabrication of extremely large containers is expensive and reliability is difficult to achieve. The sizes required for future space operations will almost certainly outstrip the manufacturing capabilities of existing facilities. In addition, surface or air cargo carriers are not available for transportation of extremely large containers.

One solution that might be proposed in the above mentioned problem is on-site fabrication. As pointed out above, however, feasibility of such plans depend on several undesirable factors including the location of the site, and the availability of personnel and equipment capable of assembling and adequately testing a large tank. In addition one must be concerned with dangers inherent in the leakage of the cryogenic, toxic or hypergolic fuels that are in use today.

Another proposed solution is to divide each large tank into several smaller transportable size tanks to be combined together into one propellant supply source. Some current boosters are using a cluster of cylindrical tanks to handle the liquide oxygen and fuel propellants. The present boosters have virtually reached the upper limit for a practical cluster arrangement of cylindrical tanks. The cluster concept is poor in volumetric and structural efficiency, has a poor strength to weight ratio and is not adaptable to simple engine thrust structures.

Accordingly it is a broad object of this invention to provide a segmented tank structure and a means for interconnecting transportable size sealable containers for construction of tanks for fluid storage.

In carrying out the principles of this invention according to a preferred embodiment, there is provided a segmented container assemblage comprising a plurality of containers, some or all of which are sealable independently of cooperation with any of the other containers; that is, integral sealing is provided in the construction of the containers and no gaskets, packing or other sealing techniques are required between segments of the tank upon field construction. Sealing of the tank walls is provided by the welded construction of the containers, thus each segment of the container assemblage is independently sealable. Mutually contiguous containers have substantially parallel walls cooperating at the edges of the tanks to provide a fastener receiving recess which is entirely external to the sealable portions of the containers and which, in certain embodiments, may be entirely within the periphery of the assemblage of containers. In the described embodiment an edge part is used which comprises an elongated piece with a substantially T-shaped cross-section welded onto the sheet walls used to form the periphery of the container. One member or flange of the T extends beyond the sealable portion of the container and cooperates with a similar flange or member on an adjacent edge of an adjacent container to receive a fastening means for securing the containers together.

Any of a variety of highly reliable fasteners can be used to engage with the flanges of contiguous containers to secure the containers together. In the described embodiment the fastening means is a blind fastener applied from the outside of the assemblage and with a portion of the blind fastener extending into the fastener receiving recess. This recess is formed external to the sealable portion of the containers by mutually diverging portions on abutting walls of the tanks adjacent to the above mentioned flanges. This recess receives the end of the fastener so that it is entirely external to the independently sealable portion of the containers.

The described embodiment provides a more efficient alternative concept to the use of a cluster arrangement of cylindrical tanks. The segmented tanks are capable of assembly at remote locations, transportation from the point of original manufacture to the site of assembly and assembly with state of the art techniques. There is flexibility in selection of size of the containers for transportation in existing or specially designed carriers. In addition to eliminating the logistics and fabrication problems there are many advantages over the clustered cylindrical tanks arrangement. For example, it is possible to achieve a much higher degree of volumetric efficiency wherein the internal structure of the assemblage is substantially completely occupied by functional components rather than mere empty space. The intercooperation of the mutually contiguous containers has a fundamentally greater stiffness to weight ratio for the same material than clustered cylindrical tanks, yielding a net increase of structural efficiency for the former over the latter. In addition, the use of a segmented container assemblage results in built-in slosh baffles within the liquid storage system to minimize center of gravity shifts due to motion of the liquid.

When the invention is used in large rocket boosters the net result of these improvements is that a simple engine thrust structure can be employed because of the symmetry of the system and tanks are adaptable to simpler interstage and fairing structures than the clustered cylindrical tanks arrangement. The present invention is superior to the use of a single tank assembled on the site because of the fabrication problems and in addition the much shorter lead time necessary before a launch can be made. It should be noted that in rocket boosters the tank assemblage can be employed with no external skin and the invention results in an inherent aerodynamic smoothness not available in other complex tankage structures. This is so by reason of the fact that the fastening means may be located in a recess which is entirely within the external periphery of the assembled tank structure even though such recess is entirely external to any individual and independently sealable tank.

Thus it is an object of this invention to provide a segmented container assemblage comprising independently sealable containers which can be fabricated, leak tested, inspected, and transported before final assembly.

It is a further object of this invention to provide a means of fastening contiguous containers together so that the fastener means is entirely external to a sealable portion of any of said containers.

It is a further object of this invention to provide a method of longitudinally segmenting large cylindrical liquid storage tanks into transportable sizes and shapes and to define a system of joining the segments into a completely pressure tight and structurally sound tank.

Other objects and many of the attendant advantages of this invention will be readily appreciated as the same becomes better understood by reference to the following detailed description when considered in connection with the accompanying drawings wherein.

In the drawings like numerals refer to like parts.

The subject invention can be used in any of a number of systems and in applications which will be obvious to one skilled in the art. For example, a container assemblage could be made incorporating the high structural efficiency and the reliability into a very small container assemblage for an individual to transport a multiplicity of fluids. Prefilled and sealed containers could be provided for replacement of expended fluids in remote locations where none but simple tools were available. Also contemplated is the application of the invention to the construction of segmented container assemblages beneath the surface of the oceans or beyond the reaches of the earth's atmosphere. Thus, of the many applications of the subject invention, the described embodiment has been selected to illustrate the principles employed in the invention.

Figure 1:
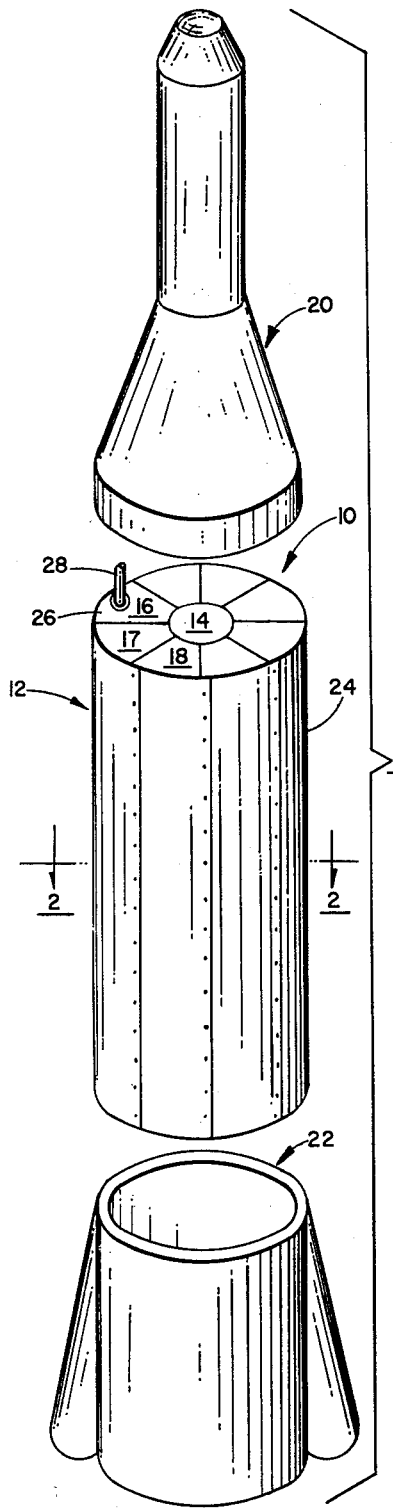
FIG. 1 is a partial exploded view of a rocket booster incorporating a segmented tank assemblage embodying the principles of the present invention.

FIG. 1 shows a typical use of a container assemblage in the first stage of a rocket booster 10. There is provided a tank assemblage 12 comprising an internal cylindrical tank 14 and eight external tanks in the form of longitudinal segments of an annular cylinder of which tanks 16, 17 and 18 are typical. This assemblage 12 is a portion of a large rocket booster 10 and is used to contain the fuels and oxidizers necessary for a launching operation. Exploded from the container assemblage to show their general relationship are the upper stages 20 of the vehicle and the section 22 containing the rocket motors (not shown). Other components of the entire booster system such as guidance and control systems are beyond the scope of this invention and are not detailed in the drawings, which indicate one suitable embodiment of the tank assemblage. Even though this embodiment shows a tank assemblage 12 comprising an internal tank 14 and eight external tanks, it will be obvious to one skilled in the art that the inner container could be made in the form of segments of a cylinder or that a different number of outer annular segments could be employed. It is also readily apparent that the container assemblage could be in the form of a segmented cylinder with no separate inner container. In the embodiment shown the skin 24 of the rocket booster 10 is comprised of the outer walls 24 of the outer tanks. This is a low weight and economical embodiment of the invention in this particular application but is not necessary for the practice thereof.

At the end of a typical one of the outer segment tanks 16 a short pipe 28 is shown extending beyond the end 26 of the tank 16. This pipe 28 is presented as typical of the pipes, tubing or other injection means (not shown) that are attached to any or all of the tanks in the assemblage 12 at either end or at some other portion of the containers in the assemblage. In many embodiments of the invention pipes, tubing or the like would be used to fill, empty, pressurize, purge or in some other way use the container for handling fluids. The details of this pipe 28 and any external plumbing associated with it are not a portion of this invention and are not examined in any further detail. It is well within the purview of one skilled in the art to employ pipes, tubing or the like integral with the tank or sealed to it by means of some conventional sealing techniques. Obviously it may be necessary to provide some sealing means in the external plumbing associated with the tank assemblage. Except for the external plumbing the tanks are completely sealed in manufacture, hence, can be thought of as sealable without any cooperation with the other tanks in the assemblage.

The details of interconnections of the container assemblage 12 with the upper stages 20 and the portion 22 of the booster 10 are not shown in FIG. 1. Conventional fastening devices for structural members are employed for this interconnection and would be obvious to one skilled in the art. Likewise, any auxiliary bulkheads or other means to secure the inner tank 14 to the outer tanks 16, 17 and 18 are not shown. It may be that one skilled in the art would employ the principles of this invention to secure the ends of these tanks rather than employ external means for their support; such an embodiment is detailed in FIG. 6 and described below.

Figure 2:
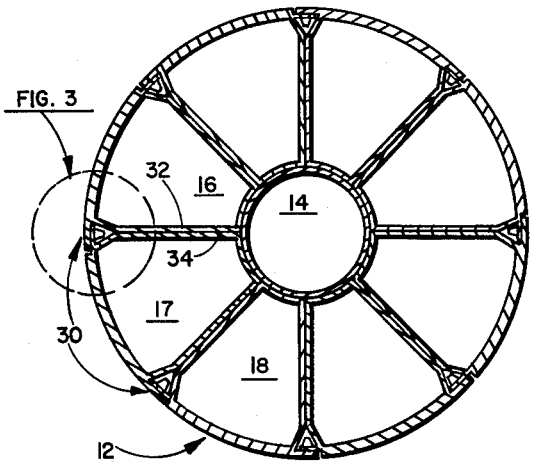
FIG. 2 is a cross-section of the tanks of FIG. 1 showing an assemblage comprising one cylindrical container surrounded by eight containers in the form of longitudinal segments of an annular cylinder.

FIG. 2 is a cross-sectional view of the tank assemblage 12 showing in more detail the inner tank 14 and the eight outer tanks of which 16, 17 and 18 are typical. Typical fastening means 30 are shown at the outer periphery of annular segment containers 16, 17 and 18. It will be obvious to one skilled in the art that fastening means could also be provided at the internal ends of the radial walls 32 and 34 of these containers 16 and 17. Such additional fastening means would increase the structural strength of the container assemblage but are not required in every embodiment thereof.

Figure 3:
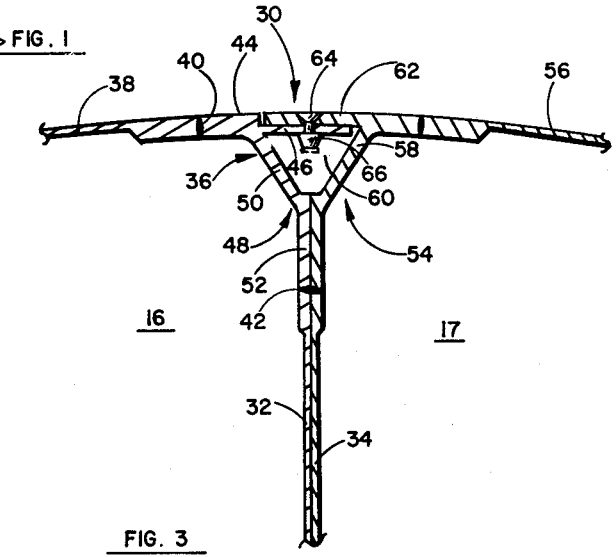
FIG. 3 is a detailed partial cross-section showing a typical joint at the outer wall of adjoining containers.

The fastening means 30 employed on the contiguous containers 16 and 17 of the container assemblage 12 is shown with greater detail in FIG. 3. This is a typical joint structure 30 at the outer skin or wall 24 of typical contiguous containers 16 and 17. Referring to a single tank 16, this joint structure 30 includes an elongated substantially T-shaped edge part 36 integrally secured to substantially perpendicular walls 32 and 38 of the container 16. This elongated edge part 36 has a substantially uniform cross-sectional geometry throughout its length. As shown in this embodiment the outside wall 38 of container 16 is welded to the T-shaped edge part 36 by a fusion weld 40. The radial wall 32 is welded to the T-shaped part 36 by means of a fusion weld 42. The fusion welds 40 and 42 run along the entire conjunctions of the edge part 36 with the adjoining walls 32 and 38, providing an integral seal for the tank 16. The T-shaped member 36 comprises three coterminous legs 44, 46 and 48, two of which 44 and 46 are substantially parallel and the other of which 48 has two portions 50 and 52. One of these portions 50 is angularly disposed relative to the parallel edge members 44 and 46. The other section 52 of this edge member 48 is substantially perpendicular to the parallel edge members 44 and 46. Thus the edge member 48 is not only partly angulated relative the parallel members 44 and 46 but is also itself angulated.

On the contiguous container 17 an edge part 54 similar to the first edge part 36 is welded to the walls 34 and 56 of the container. A portion 58 of this T-shaped edge part 54 is angulated relative to the rest of the edge part 54 and is mutually diverging from the corresponding angulated portion 50 on the other edge part 36. The mutual divergence of these portions 50 and 58 of the edge parts results in a substantially triangular recess 60 between the contiguous containers 16 and 17. One of the edge members 62 on the edge part 54 of the tank 17 is substantially parallel to the outer wall 56 of the tank 17 and extends at least partially across the recess 60 between the tanks 16 and 17. The corresponding edge member or flange 46 extends from the tank 16 and likewise extends at least part way across the recess 60. The two edge members or flanges 46 and 62 are constructed to underlap and overlap respectively to form a closure for the recess 60. The two flanges 46 and 62 cooperate to close the fastener receiving recess 60 and result in an aerodynamically smooth surface for the outer wall 24 of the assemblage 12. Thus the recess 60 which is external to containers 16 and 17 is internal to the assemblage. A fastener means 64 engages with both of the flanges 46 and 62 to secure the containers 16 and 17 together. In this embodiment the fastener means 64 is shown as a flat-headed, countersunk, blind rivet but it will be obvious to one skilled in the art that other types of blind rivets, bolts, pins, clips, connectors or the like could be adapted to the purpose.

The purpose of the recess 60 between the tanks 16 and 17 is to receive the end 66 of the blind fastener 64. This fastener receiving recess 60 is external to the sealable portion of the containers 16 and 17. Thus the end 66 of the fastener means 64 extends into the fastener receiving recess 60, and the sealing walls 32, 28, 34 and 56 of the containers 16 and 17 are not penetrated. The fastener means 64 cooperates with the flanges 46 and 62 of the containers 16 and 17 and is entirely external to the sealable portion of the containers 16 and 17. The fastener receiving recess 60 provides clearance for the internal end 66 of the fastener means 64 so that this internal end 66 will remain external to the two tanks 16 and 17 being secured together. In this way there is no necessity for an independent seal at the time of interconnection of the two containers and gaskets, packing, bladders, diaphragms, films, cements, fillers, and the like are not required along the edges of the tank.

Figure 5:
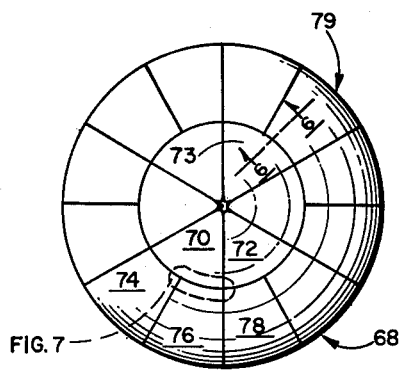
FIG. 5 is a top elevation of the tank assemblage shown in FIG. 4.
Figure 4:
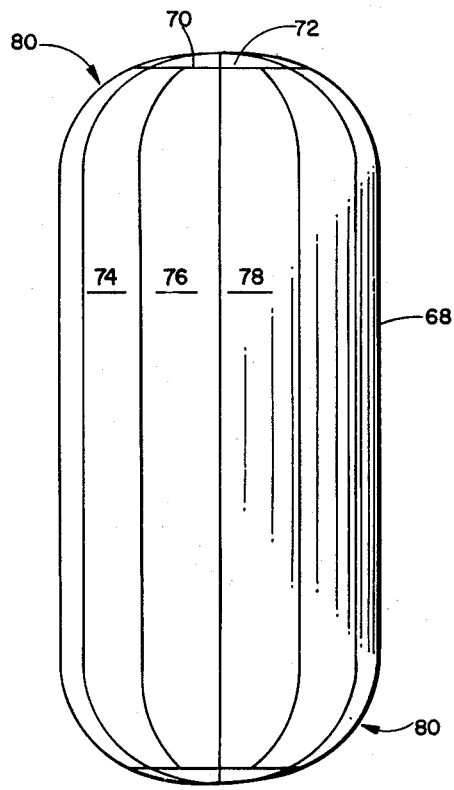
FIG. 4 is a view showing a tank assemblage comprising six containers in the form of longitudinal segments of a cylinder, circumscribed by twelve containers in the form of longitudinal segments of an annular cylinder, the ends of all containers formed to cooperate to form domed ends on the container assemblage.

Another embodiment of a container assemblage which is of utility in large rocket boosters or similar structures is illustrated in FIGURES 4 and 5. FIG. 4 is a side view of the tank assemblage 68 comprising six internal containers in the form of longitudinal segments of a cylinder, of which 70 and 72 are typical and twelve external containers in the form of longitudinal segments of an annular cylinder of which 74, 76 and 78 are typical. Again it will be apparent to one skilled in the art that a different plurality of segments of either a cylinder or an annular cylinder could be employed in the practice of the invention without departing from the spirit or scope thereof. The ends 80 of the assemblage 68 of FIG. 4 are in the form of domes rather than the flat heads 11 of the assemblage 12 shown in FIGS. 1 and 2. The ends of the outer containers such as 74, 76 and 78 are curved inwardly so as to intercooperate and to cooperate with the ends of the inner containers such as 70 and 72 to form a smooth curvilinear surface. Elongated edge parts at the edges of the containers may be provided with a curved portion to extend along the curved ends 80 of the container assemblage 68. Likewise edge parts may be provided on the contiguous edges between the inner and outer containers in the assemblage as is deemed necessary by one skilled in the art to provide sufficient strength for a particular application. Obviously one skilled in the art could apply a variety of end shapes to container assemblages both in cylindrical and non-cylindrical structures.

FIG. 5 is a top elevation of the tank assemblage 68 showing with greater clarity the existence of the six containers in the form of sector segments, of which 70, 72 and 73 are typical, and the twelve circumscribing containers in the form of segments of an annular cylinder of which 74, 76 78, and 79 are typical.

Figure 6:
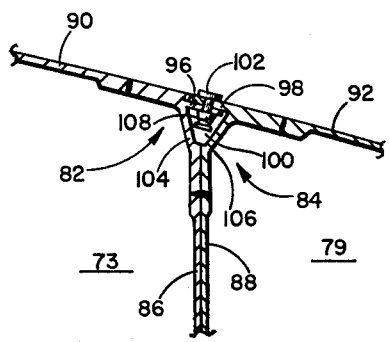
FIG. 6 is a detailed partial view of a typical joint at the ends of adjoining containers of FIG. 5.

FIG. 6 is a partial view of a cross-section of a typical joint in the location indicated by section line 6—6 on FIG. 5. This joint is at the domed end 80 of the assemblage 68 and is between a typical inner container 73 and a typical outer container 79. The structure of the joint between tanks 73 and 79 is analogous to the joint 30 between containers 16 and 17 as shown in FIG. 3. Edge parts 82 and 84 are integral parts of containers 73 and 79 respectively and serve to seal the containers and provide intercontainer mechanical connections. Since the ends 80 of the containers in the assemblage 68 are formed in a curvilinear structure rather than being flat, the outer skins 90 and 92 of the containers 73 and 79 are not substantially perpendicular to the mutually abutting walls 86 and 88. Rather, because of the curvature involved, the substantially T-shaped edge part 82 has a total included obtuse angle between the walls 86 and 90 rather than an angle of substantially 90°. Likewise the substantially T-shaped elongated edge part 84 has a total included acute angle between the walls 88 and 92. The exact configuration of the joint at the ends of the containers is dictated by the overall geometry selected for the ends. Fastener means 94 is provided engaging with the flanges 96 and 98 on the two containers 73 and 79. The fastener means 94 in FIG. 6 is a blind rivet with one end 108 extending into a fastener receiving recess 100 between the two tanks. Since it is not necessary that the end portion 80 of the assemblage 68 have aerodynamic properties in this embodiment, it is possible for the fastener means 94 to have any convenient type of head 102 such as the mushroom type shown herein. When fastening the ends of the independently sealable containers together it is still necessary that the fastener means 94 remain external to the sealable portion of the containers 73 and 79. Thus, a fastener receiving recess 100 is provided by means of diverging portions 104 and 106 of the edge parts 82 and 84 in a manner analogous to the recessed portions 50 and 58 of FIG. 3. The fastener 94 has an end portion 108 extending into the fastener receiving recess so as to be external to the sealable portion of the containers 73 and 79. Thus, assembly can be from the outside of the entire container assemblage 68 and field assembly can be made without the use of gaskets, packing films, fillers, cements, bladders, sealants, and the like.

Figure 7:
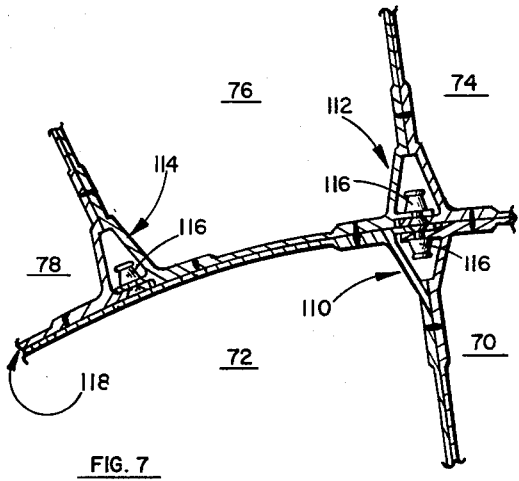
FIG. 7 is a detailed partial view showing typical joints at the inner wall of adjoining annular containers and a joint at the outer wall of adjoining inner containers of FIG. 5.

FIG. 7 shows a partial view of typical joint cross-section 110, 112 and 114 in the interface between typical containers 70 and 72 and outer containers 74, 76 and 78 in FIGS. 4 and 5. This cross-section is located at a portion appproximately midway between the ends 80 of the containers. Portions of the inner containers 70 and 72 are shown as joined by the typical joint structure 110. The tanks 74 and 76 are joined by a typical joint 112 and the tanks 76 and 78 are joined by a typical joint 114. All of these joints are made by means of countersunk flat headed rivets 116 engaging with the containers in a manner analogous to the fastener means 64 in FIG. 3. This flush mounting of the inner tanks 70 and 72 is made to the inner wall line 118 of the outer annular segments 74, 76 and 78.

In the practice of this invention for transportable size containers for assembly into a large structure for containing fluids, the following general mode of operation is employed. An elongated edge part is made with a substantially T-shaped cross-section of the geometry previously described and illustrated in FIG. 3. In a preferred embodiment this elongated edge part of the tanks is made by an extruding process. It will be obvious to one skilled in the art, however, that the geometry of edge part required could be produced by forging, milling or other suitable forming operations. In the preferred embodiment these extrusions are of a suitable alloy of aluminum. Flat and precurved sheets of an aluminum alloy with weld compatibility to the extruded edge parts are prepared and welded to the edge parts to produce a complete tank. The geometry of this tank in the preferred embodiment is in the form of a cylinder, a sector of a cylinder or a longitudinal segment of an annular cylinder. However, it will be obvious to one skilled in the art that some other convenient geometry can be employed utilizing the principles of the invention. The completed container is provided with suitable external plumbing for filling, emptying, and venting the container. Conventional types of accessory plumbing may be employed. With the exception of these plumbing attachments the tank is otherwise completely sealed without resort to gaskets, packings, or other non-integral sealing means. Thus, by providing seals on the plumbing connections, the tank is independently sealable without any cooperation with other tanks to be used in the completed assemblage. Likewise connection to other components of the system in which the container assemblage is used may be by means of conventional fastening and structural techniques.

After construction of the individual tanks by means of welding sheets to the extruded edge parts, leak testing, and inspection to verify the sealing of the containers, they are ready for dispatching to the final assembling site. It should be noted that the invention as described herein does not preclude the use of sheets whose cross section has been reduced in some areas to reduce the weight or sheets including stiffening ribs, the use of honeycomb panels, insulated sheets and the like. It is also obvious to one skilled in the art that the elongated edge parts need not be welded to the sheet sides of the tank, but may be brazed, cemented or the like.

Upon arrival of the independently sealable containers at the assembling site, the containers are erected into the shape of the final assemblage and secured together by means of field techniques. By field techniques is meant the use of high reliability fastening devices such as, for example, blind rivets. Other types of fastener means such as bolts, pins, clips, rivets, welding, cementing and the like could be employed by one skilled in the art. Similar conventional fastening means can be used to secure the assemblage into place into the system into which it is to be used.

Thus, it is possible to assemble a substantially large container assemblage in the field with no necessity for providing means of checking the seal obtained on the tanks after interconnection. This container assemblage has a high structural efficiency and superior strength to weight ratio due to the structural cooperation of abutting walls of contiguous containers. There is great adaptability for construction of large sizes of high reliability liquid storage systems that were unavailable in the prior art.

Although only certain embodiments have been set forth, it is apparent that various changes and modifications may be made by one skilled in the art without departing from the scope of this novel concept. It is to be understood that the above is by way of illustration only and is not to be taken by way of limitation, the spirit and scope of this invention being limited only by the terms of the claims.

What is claimed is:

1. A segmented container assemblage comprising a plurality of independently sealable containers in the form of longitudinal segments of an annular cylinder, said assemblage having a smooth cylindrical outer surface and a smooth cylindrical inner surface; a first one of said containers comprising a first wall, a second wall angularly disposed to said first wall, and a first edge part fixed to said first wall and said second wall, said edge part comprising three angularly disposed edge members joined at a common conjunction, the first of said edge members being fixed to said first wall substantially parallel therewith and remote from the conjunction, the second of said edge members being substantially parallel to said first edge member and having an outer surface that is a smooth continuation of the outer surface of said first edge member, the third of said edge members being angularly disposed to said first and second edge members at their conjunction and angulated so as to have a portion parallel to said second wall, said portion being fixed to said second wall remote from the conjunction; a second one of said containers comprising a third wall substantially parallel with said first wall, a fourth wall angularly disposed to said third wall and adjoining said second wall, and a second edge part fixed to said third wall and said fourth wall, said second edge part comprising three angularly disposed edge members joined at a common conjunction, the first of said latter edge members being fixed to said third wall substantially parallel therewith and remote from the conjunction, the second of said latter edge members being substantially parallel to said first edge member and having an outer surface that is displaced inwardly from the surface of said latter first edge member a distance equal to the thickness of said former second edge member so that said second edge members are in overlapping and underlapping relationship respectively and said edge parts cooperate to have a substantially smooth outer surface on said assemblage, the third of said latter edge members being angularly disposed to said latter first and second edge members at their conjunction and angulated so as to have a portion parallel to said fourth wall, said portion being fixed to said fourth wall remote from the conjunction, the angulated portions of said third edge members forming a fastener receiving recess therebetween external to the sealable portion of said containers; and blind fastener means in securing engagement with said second edge members to secure said first and second containers together, said fastener means having a flush outer head and an inner portion extending into said fastener receiving recess.

2. A segmented container assemblage as defined in claim 1 further comprising a plurality of sealable inner containers in the form of longitudinal segments of a cylinder assembled to form an inner cylinder in said annular cylinder.

3. A segmented container assemblage as defined in claim 1 further comprising a sealable cylindrical container in said annular cylinder.

4. A rocket booster comprising a plurality of independently sealable containers in the form of longitudinal segments of an annular cylinder so as to collectively form a smooth annular cylinder having a smooth axial passage; each of said containers comprising an outer arcuate wall having a curvature equal to the curvature of said annular cylinder; an inner arcuate wall having a curvature equal to the curvature of the axial passage through said annular cylinder; radially extending flat walls extending between said inner wall and said outer wall; and extruded edge parts fixed to each of said flat walls and said outer wall to form a joint therebetween; each said edge part having a substantially T-shaped cross-section having one arm welded to said outer wall, the leg welded to said flat wall and having a portion rebated therefrom, and having the other arm extending parallel to said outer wall to cooperate with an arm on a continguous edge part on a contiguous container, the welded portion of said one arm and said leg being remote from the intersection thereof; the rebated portion of said legs and the extending arms of contiguous edge parts cooperating to form a fastener receiving recess external to the sealable portion of said containers; said extending arms of contiguous edge parts underlapping and overlapping respectively, said underlapping arm being rebated so that said overlapping arm is substantially in line with the outer arcuate wall of the container having the underlapping arm so as to form a smooth cylindrical surface; second extruded edge parts fixed to said flat walls and to said inner arcuate wall to form a joint therebetween; each said second edge part having a substantially T-shaped cross-section having one arm welded to said inner arcuate wall, the leg welded to said flat wall and having a portion rebated therefrom, and having the other arm extending parallel to said inner arcuate wall to cooperate with an arm on a contiguous edge part of a contiguous container, the welded portion of said one arm and said leg being remote from the intersection thereof; the rebated portions of said legs and the extending arms of contiguous edge parts cooperating to form a fastener receiving recess external to the sealable portion of said containers; said extending arms of contiguous containers underlapping and overlapping respectively, said underlapping arm being rebated so that said overlapping arm is substantially in line with the inner arcuate wall of the container having the underlapping arm so as to form a smooth cylindrical surface; and blind fastener means in securing engagement with the extending arms of contiguous edge parts, said fastener means having a flush external head and a portion extending into said recess.

References Cited in the file of this patent

UNITED STATES PATENTS

| 1,645,944 | Derbor | Oct. 18, 1927 |
| 2,790,489 | Denison | Apr. 30, 1957 |

FOREIGN PATENTS

| 326,594 | Italy | June 7, 1935 |
| 468,746 | France | May 1, 1914 |